United States Patent [19]

Djeu

[11] Patent Number: 4,961,768

[45] Date of Patent: Oct. 9, 1990

[54] METHODS FOR BONDING OPTICAL FIBERS TO WAFERS

[76] Inventor: Nicholas I. Djeu, 3912 Northhampton Way, Tampa, Fla. 33624

[21] Appl. No.: 340,946

[22] Filed: Apr. 20, 1989

[51] Int. Cl.⁵ ............................................ C03B 23/207
[52] U.S. Cl. ........................................ 65/4.21; 65/40; 65/42; 65/43; 150/99; 150/272.2; 150/272.8
[58] Field of Search ..................... 65/4.2, 36, 4.1, 40, 65/42, 43; 156/99, 100, 272.2, 272.8, 310, 324.4, 280

[56] References Cited

U.S. PATENT DOCUMENTS

| | | | |
|---|---|---|---|
| 3,217,088 | 11/1965 | Steierman | 65/40 X |
| 3,749,562 | 7/1973 | Nicolas et al. | 65/36 X |
| 3,966,447 | 6/1976 | Asahara et al. | 65/40 |
| 4,236,904 | 12/1980 | Lazay | 65/13 X |
| 4,510,005 | 4/1985 | Nijman | 156/272.8 X |
| 4,598,039 | 7/1986 | Fischer et al. | 156/272.8 X |
| 4,687,500 | 8/1987 | Gelo et al. | 65/36 |

FOREIGN PATENT DOCUMENTS

WO86/07568 12/1986 PCT Int'l Appl. ............. 156/272.8

Primary Examiner—Robert L. Lindsay
Attorney, Agent, or Firm—Joseph C. Mason; Ronald E. Smith

[57] ABSTRACT

Methods for bonding transparent materials to opaque materials. The materials to be bonded are placed in tightly abutting relation to one another, and an energetic laser pulse is directed through the transparent material until it melts a thin surface layer of the opaque material. The desired bond is formed when the melted layer solidifies. In alternative embodiments the transparent material is precoated with various mediator materials to facilitate the bonding process.

10 Claims, 1 Drawing Sheet

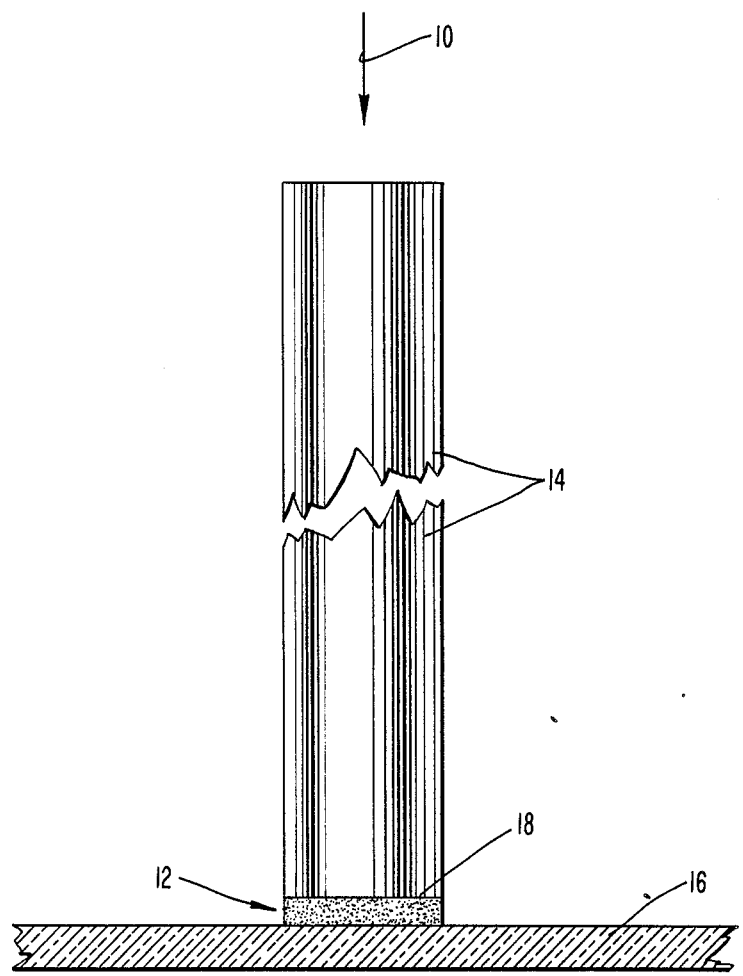

4,961,768

METHODS FOR BONDING OPTICAL FIBERS TO WAFERS

Technical Field

This invention relates, generally, to laser applications. More particularly, it relates to the bonding of optical fibers or other transparent materials to semiconductor wafers or other opaque materials by a pulsed laser that emits coherent electromagnetic radiation at a preselected wavelength.

Background Art

Lasers have been used for bonding specific plastic materials disposed in sandwiching relation to an opaque material as evidenced by German patent No. 1,629,225.

The specific method disclosed in that patent, however, has limited applications. For example, the patented method cannot be employed to attach optical fibers to optoelectronic integrated circuits, nor does it have broad application in bonding transparent materials to opaque materials.

As is well known, optical fibers are commonly employed to couple a source of electromagnetic radiation to optoelectronic devices. Due to the small size of optoelectronic devices, the attachment procedure is difficult and misalignments are common. If an optoelectronic device requires a certain threshold amount of radiation to activate it, even a small misalignment between it and the optical fiber can result in failure of the circuitry to perform its intended function.

Epoxy is commonly used to adhere the fiber to the semiconductor wafer, so even if a good alignment is achieved by following prior art alignment techniques, the bond itself is often of poor quality. Epoxy ages and becomes unstable, for example. Perhaps even more importantly, epoxy has little utility in applications where a bundle of closely packed optical fibers must be adhered to a large plurality of closely spaced optoelectronic devices.

Another obvious shortcoming of prior art bonding techniques is the fact that they must be performed by humans; automation of the attachment process has heretofore been impractical due to the precise nature of the alignments required and the careful application of epoxy that must be made.

There has long been a need to automate the process of attaching optical fibers to semiconductor wafers. A successful automated process would allow precise alignments to be achieved, thereby greatly reducing the rejection rate of integrated circuits including optoelectronic devices. Moreover, if an automated process could be developed that did not rely upon the use of epoxy, then the circuits produced would have longer life.

A pioneering breakthrough is required because the art contains no teachings or suggesting as to how the major obstacles to future progress in this important field could be achieved.

Disclosure of Invention

A transparent material, such as sapphire, is placed into abutting relation to an opaque material such as silicon. An energetic laser pulse is used to melt a thin surface layer of the opaque material so that a bond between the materials is formed when the thin surface layer of the opaque material solidifies upon cooling.

In an alternative embodiment of the invention, the transparent material is precoated with a layer of the opaque material to which it is to be bonded. The thickness of the precoated layer is preselected so that the laser pulse penetrates and melts the entire precoated layer through either direct or conduction heating as it melts the thin surface layer of the opaque material to which the transparent material is to be bonded.

In another alternative embodiment, a second transparent or opaque material that adheres well to the first transparent material and to the opaque material, because of its structural affinity for both, is applied in a precoated layer to the first transparent material. The second transparent or opaque material mediates the bonding of the first transparent material and the opaque material due to its mutual compatibility.

A very general object of this disclosure is to teach new uses for lasers.

Another object is to teach the art how to bond transparent and opaque materials together by using lasers.

Still another object is to disclose an improved method for bonding optical fibers to wafers.

A major object of this invention is also to disclose a method whereby the bonding of optical fibers to optoelectronic devices is automated so that misalignments rarely occur, and which method is not reliant upon the use of epoxy.

The invention accordingly comprises the features of construction, combination of elements and arrangement of parts that will be exemplified in the construction set forth hereinafter and the scope of the invention will be set forth in the claims.

Brief Description of Drawings

For a fuller understanding of the nature and objects of the invention, reference should be made to the following detailed description, taken in connection with the accompanying drawing, in which:

The FIGURE is a diagrammatic representation of an alternative embodiment of the invention.

Best Modes for Carrying Out the Invention

Although it is believed that the present invention can be employed to bond virtually any transparent material to virtually any opaque material, this disclosure will be directed toward methods for bonding optical fibers, which are transparent, to semiconductor wafers, which are opaque. Specifically, optoelectronic devices are the type of wafers which are of interest.

Although wafers are made of differing materials, the invention will be described in terms of silicon wafers; those skilled in the art will appreciate the fact that the invention is not limited, however, to the use of silicon.

Similarly, optical fibers may be made of differing materials; the disclosure will refer to sapphire optical fibers, it being understood that the invention is not limited to that particular transparent material.

A novel method includes the following steps: The optical fiber to be bonded to an optoelectronic device is firmly pressed against the device to form a tight mechanical abutting relation therebetween. The mechanical pressure is maintained throughout the duration of the novel process. Importantly, the contour of the fiber must match the contour of the site of the optoelectronic device where the abutting engagement is made.

A laser pulse of a preselected frequency is then directed to the juncture site through the fiber. The frequency of the pulse is of critical importance; the transparent material will be optically transparent to pulses of certain frequencies, i.e., the light will pass through the transparent material with little or no absorption, and the wafer material will be optically opaque to certain frequencies, i.e., the light will be substantially absorbed by the wafer. Accordingly, if light at a preselected frequency is substantially unabsorbed by the transparent material and substantially absorbed by the wafer material, a thin surface layer of the wafer material will melt and the transparent material will be substantially unaffected. Due to the aforementioned mechanical pressure, the transparent material will be displaced at least slightly into the opaque material when the thin surface of the latter melts as a result of said absorption of energy. Upon removal of the source of energy, the opaque material will solidify as it cools and a bond will be formed.

Some materials may not bond easily due to incompatibility of structure, but it has been found that sapphire and silicon bond readily at certain preselected wavelengths of coherent radiation. Specifically, sapphire is optically transparent or non-absorbing to coherent light having a wavelength in the 300 nm to 1100 nm range; advantageously, silicon is highly absorbing in the same range. Accordingly, when coherent light having a wavelength between 300 nm–1100 nm is directed at the physical juncture of the two materials, the sapphire is substantially unaffected and a thin surface layer of the silicon wafer melts since heat energy is released as the wafer absorbs the radiation. Sapphire and silicon are compatible in structure, so that upon deactivation of the laser, and the solidification of the silicon that follows, a very strong bond is established. Just as importantly, the human element is removed and the method accordingly lends itself to automation.

An alternative embodiment of the invention is shown in the FIGURE and includes the use of a mediator material to facilitate the bonding process. More specifically, this alternative embodiment adds the step of preparing the optical fiber or other transparent material by coating it with a layer of the opaque material to which it is to be bonded before beginning the bonding process. Since the opaque material is obviously self-compatible, the precoating assures that a good bond will be formed, even where the transparent material may have limited compatibility with the opaque material to which it is to be bonded. In the FIGURE, a fusing laser pulse 10 at a preselected frequency is directed toward fusion site 12 through an optical fiber 14; the waveguide structure is denoted 16 and the mediating material is denoted 18.

As another alternative, instead of precoating the transparent material with a thin layer of the opaque material to which it is to be bonded, a transparent material may be coated with a layer of a second transparent or opaque material. The second transparent or opaque material selected in order to serve as an efficient mediator must be compatible in structure with the wafer material to which the transparent material is to be bonded. The FIGURE may also be understood as depicting this embodiment as well.

Thus, in both of these alternative embodiments, the step of precoating the transparent material with a material known to be compatible in structure with the target opaque material facilitates the forming of a good bond.

Crystal materials with similar lattice structures are usually quite compatible with one another, although many other types of materials are also sufficiently compatible.

When the transparent material is coated with a mediator opaque material as just disclosed, the thickness of the layer of the mediating material must be carefully preselected to insure that the laser light penetrates and melts the entire precoated layer to insure that bonding takes place.

Still another alternative embodiment also employs the mediator technique, but the mediator is a second transparent material. More particularly, the transparent material to be bonded to the opaque material is precoated with a second transparent material having an affinity for both the first transparent material and the opaque material to which the first transparent material is to be bonded. Again, the FIGURE may be interpreted as also illustrating this embodiment.

The bonding of optical fibers to optoelectronic devices is commonly called pigtailing; this invention has significant utility in the pigtailing process. Multiple pigtailing, where bundles of fibers are coupled to multiple optical waveguides, is achievable by following the steps disclosed herein. Moreover, the steps may be performed by automated devices; thus, a revolutionary advance in the art has been achieved and the claims that follow are entitled to broad interpretation to protect the heart of the invention as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method of bonding an optical fiber to a substantially opaque material, comprising the steps of:
   selecting an optical fiber and an opaque material that are substantially non-absorptive and absorptive, respectively, to coherent electromagnetic radiation of a preselected wavelength;
   positioning said optical fiber and opaque material in abutting relation to one another;
   preselecting a wavelength of coherent electromagnetic radiation that is substantially unabsorbed by said optical fiber and that is substantially absorbed by said opaque material;
   directing coherent electromagnetic radiation of said preselected wavelength to a site where said optical fiber and said opaque material abut one another through the axial bore of said optical fiber;
   whereby a thin surface layer of said opaque material is temporarily melted by the heat energy absorbed by said opaque material, and whereby said optical fiber is substantially unaffected by said radiation, so that a bond is formed between optical fiber and the opaque material when said thin surface layer of opaque material cools and solidifies.

2. The method of claim 1, further comprising the step of contouring said optical fiber and said opaque material so that they are complementarily formed with respect to one another prior to the step of positioning said materials in abutting relation to one another.

3. The method of claim 2, further comprising the step of pressing said optical fiber and said opaque material against one another to establish a tightly abutting mechanical juxtaposition therebetween.

4. The method of claim 1, further comprising the step of precoating said optical fiber with a layer of the opaque material prior to the step of positioning said materials in abutting relation to one another.

5. The method of claim 1, further comprising the step of precoating said optical fiber with a layer of an opaque material that has a structural affinity for the opaque material to which said optical fiber is to be bonded.

6. The method of claim 1, further comprising the step of precoating said optical fiber with a transparent material having a structural affinity for the opaque material to which said optical fiber is to be bonded, and having a structural affinity for the optical fiber that is precoated with said transparent material.

7. The method of claim 3, wherein said opaque material is an optical waveguide.

8. The method of claim 3, wherein said transparent material is an optical fiber made of sapphire.

9. The method of claim 8, wherein said opaque material is a wafer made of a semiconductor material.

10. The method of claim 9, wherein said preselected wavelength is between 300 nm–1100 nm.

* * * * *